(12) United States Patent
Marupaduga

(10) Patent No.: US 11,166,194 B1
(45) Date of Patent: Nov. 2, 2021

(54) LOCATION-BASED ERROR CORRECTION FOR WIRELESS DATA COMMUNICATIONS

(71) Applicant: T-MOBILE INNOVATIONS LLC, Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/838,850

(22) Filed: Apr. 2, 2020

(51) Int. Cl.
*H04W 28/04* (2009.01)
*H04L 1/18* (2006.01)

(52) U.S. Cl.
CPC ........... *H04W 28/04* (2013.01); *H04L 1/1812* (2013.01); *H04L 1/1816* (2013.01); *H04L 1/1819* (2013.01); *H04L 1/1825* (2013.01)

(58) Field of Classification Search
CPC .... H04W 28/04; H04L 1/1812; H04L 1/1819; H04L 1/1825; H04L 1/1816
See application file for complete search history.

(56) References Cited

U.S. PATENT DOCUMENTS

| | | | |
|---|---|---|---|
| 9,179,333 B1 | 11/2015 | Bartlett et al. | |
| 9,408,144 B2 | 8/2016 | Tabet et al. | |
| 10,034,272 B2 | 7/2018 | Wu | |
| 10,205,561 B2 | 2/2019 | Kamuf et al. | |
| 10,291,372 B2 | 5/2019 | Azarian Yazdi et al. | |
| 2007/0041349 A1 | 2/2007 | Kim et al. | |
| 2008/0220806 A1* | 9/2008 | Shin | H04W 52/06 455/522 |
| 2010/0240380 A1* | 9/2010 | Yim | H04W 72/082 455/450 |
| 2012/0201121 A1* | 8/2012 | Huang | H04L 1/1825 370/216 |

FOREIGN PATENT DOCUMENTS

| | | | |
|---|---|---|---|
| WO | 2013139139 A1 | 9/2013 | |
| WO | WO-2020088648 A1 * | 5/2020 | ........... H04L 69/324 |

* cited by examiner

*Primary Examiner* — Moo Jeong

(57) ABSTRACT

A wireless access node controls error correction for wireless User Equipment (UEs). A radio wirelessly exchanges data with the wireless UEs and exchanges the data with a baseband unit. Some of the data is corrupt or missing. The baseband unit exchanges redundant data with the radio to replace a portion of the corrupt or missing data per an error correction target. The radio wirelessly exchanges the redundant data with the wireless UEs. The baseband unit identifies a concentration of the UEs at a location and responsively modifies the error correction target based on the location. The radio wirelessly exchanges additional data with the wireless UEs and exchanges the additional data with the baseband unit. Some of the additional data is corrupt or missing. The baseband unit exchanges redundant data with the radio to replace a portion of the corrupt or missing additional data per the modified error correction target.

20 Claims, 7 Drawing Sheets

LOCATION-BASED ERROR CORRECTION FOR WIRELESS DATA COMMUNICATIONS

TECHNICAL BACKGROUND

Wireless communication networks provide wireless data services to wireless user devices. The wireless data services include internet-access, media-streaming, machine communications, and the like. Exemplary wireless user devices comprise phones, computers, wearable transceivers, vehicles, robots, and sensors. The wireless communication networks have wireless access nodes that exchange wireless signals with the wireless user devices over radio frequencies using wireless network protocols. Exemplary wireless network protocols include Long Term Evolution (LTE) and Fifth Generation New Radio (5GNR).

The wireless access nodes and wireless user devices perform error correction on their wireless data exchanges. To correct the wireless communication errors, the user devices and access nodes detect the errors and then retransmit the lost or corrupt data. Typically, the wireless access nodes and user devices do not correct all of the errors and allow a small portion of errors to remain—like 3%. This small portion of allowed wireless communication errors comprises an error correction target. The access nodes and user devices will retransmit data if needed to achieve the error correction target, but the access nodes and user devices will not retransmit the data when the error correction target will still be achieved without retransmission. The error correction targets are often static values. In some examples, the error correction targets are occasionally modified based on inputs like sector load or historical throughput.

Unfortunately, the wireless access nodes and user devices fail to efficiently use UE location to effectively control the error correction target. Moreover, the wireless access nodes do not optimize the error correction target based on multiple factors including UE concentrations.

TECHNICAL OVERVIEW

A wireless access node controls error correction for wireless User Equipment (UEs). A radio wirelessly exchanges data with the wireless UEs and exchanges the data with a baseband unit. Some of the data is corrupt or missing. The baseband unit exchanges redundant data with the radio to replace a portion of the corrupt or missing data per an error correction target. The radio wirelessly exchanges the redundant data with the wireless UEs. The baseband unit identifies a concentration of the UEs at a location and responsively modifies the error correction target based on the location. The radio wirelessly exchanges additional data with the wireless UEs and exchanges the additional data with the baseband unit. Some of the additional data is corrupt or missing. The baseband unit exchanges redundant data with the radio to replace a portion of the corrupt or missing additional data per the modified error correction target.

DETAILED DESCRIPTION

Figure 1:
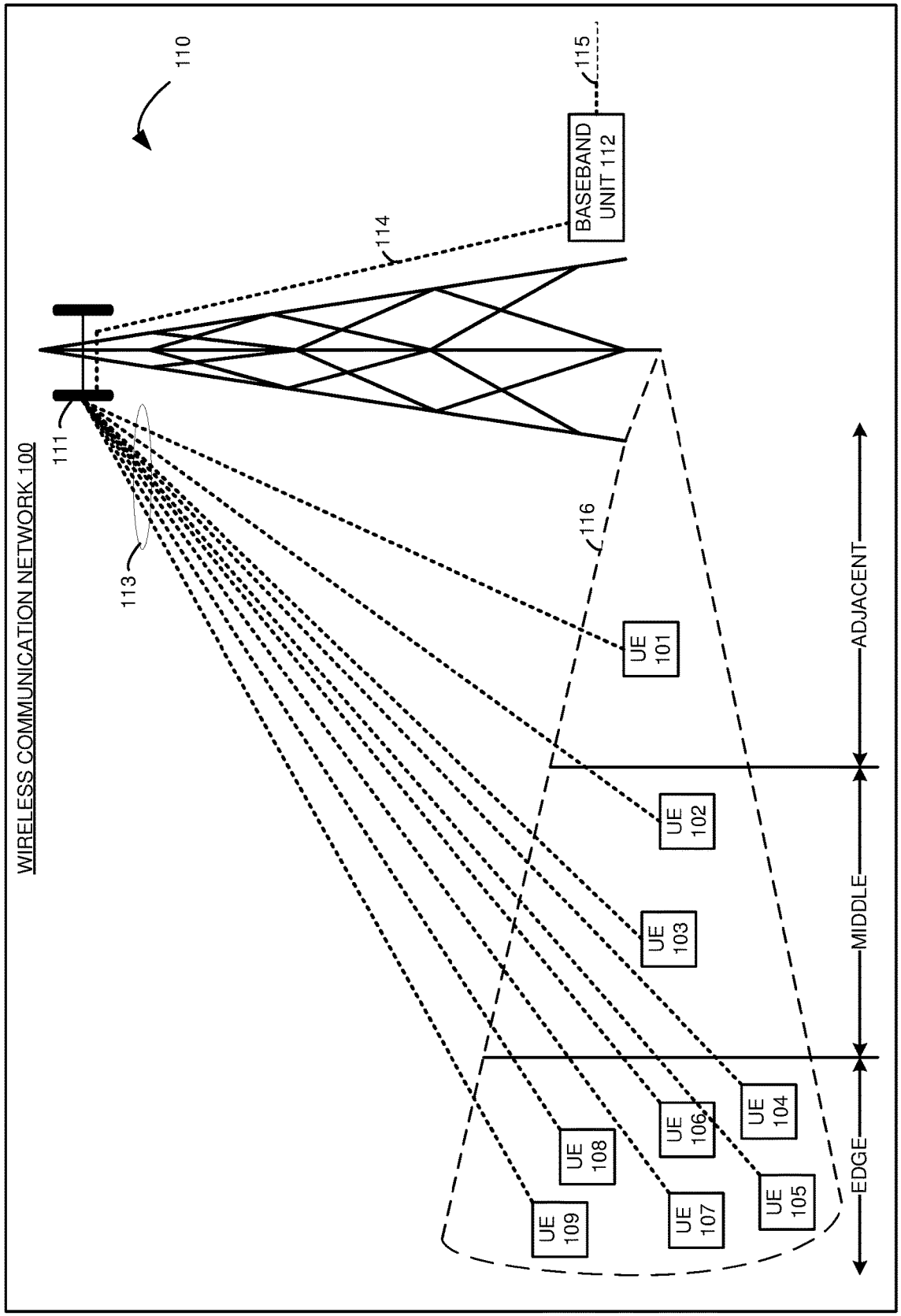
FIG. 1 illustrates a wireless communication network that controls error correction for wireless data communications with wireless User Equipment (UEs) based on UE location.

FIG. 1 illustrates wireless communication network 100 that controls error correction for wireless data communications with wireless User Equipment (UEs) 101-109 based on UE location. Wireless communication network 100 supports wireless data services like internet-access, media-streaming, data messaging, machine-control, machine-communications, and/or some other wireless data product. Wireless communication network 100 comprises UEs 101-109 and wireless access node 110. Wireless access node 110 comprises radio 111, baseband unit 112, and node links 114. Radio 111 is mounted on a tower, but radio 111 could have a different mounting or no mounting at all.

Wireless UEs 101-109 are located in geographic area 116. Geographic area 116 comprises a wireless network sector, network geofence, or some other physical region that is served by wireless access node 110. Wireless access node 110 typically has additional radios that serve other geographic areas or that use different carrier frequencies. Wireless access node 110 typically serves many more than nine UEs, and the number of UEs in geographic area 116 has been restricted for clarity.

Wireless UEs 101-109 and radio 111 communicate over wireless links 113. Radio 111 and baseband unit 112 communicate over node links 114. Baseband unit 112 communicates with other network elements over network links 115. Wireless links 113 use frequencies in the low-band, mid-band, high-band, or some other part or the wireless electromagnetic spectrum. Wireless links 113 use wireless protocols like Fifth Generation New Radio, (5GNR), Long Term Evolution (LTE), Low-Power Wide Area Network (LP-WAN), Institute of Electrical and Electronic Engineers (IEEE) 802.11 (WIFI), and/or some other networking technology. Node links 114 use Common Radio Public Interface (CPRI) or some other radio interface protocol. Network links 115 use Time Division Multiplex (TDM), IEEE 802.3 (ETHERNET), Internet Protocol (IP), Data Over Cable System Interface Specification (DOCSIS), LTE, 5GNR, virtual switching, radio tunneling protocols, and/or some other networking protocols.

Radio 111 comprises antennas, filters, amplifiers, analog-to-digital interfaces, microprocessors, memory, software, transceivers, bus circuitry, and the like. BBU 113 comprises microprocessors, memory, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors read the software from the memories and execute the software to direct wireless communications with UEs 101-109 and to direct network communications over network links 115.

UEs 101-109 could be phones, computers, vehicles, or some other apparatus with wireless communication circuitry. UEs 101-109 comprise radios and user circuitry. The radios comprise antennas, filters, amplifiers, analog-to-digital interfaces, microprocessors, memory, software, transceivers, bus circuitry, and the like. The user circuitry comprises user interfaces, microprocessors, memory, software, transceivers, bus circuitry, and the like. The microprocessors comprise DSP, CPU, GPU, ASIC, and/or the like. The memories comprise RAM, flash circuitry, disk drives, and/or the like. The memories store software like operating systems, user applications, network applications, and radio applications. The microprocessors read the software from the memories and execute the software to direct wireless communications with radio 111 and to direct user communications through the user interfaces with machines, animals, and/or humans.

Wireless UEs 101-109 and radio 111 wirelessly exchange data over wireless links 113. Radio 111 and baseband unit 112 exchange the data over node links 114. Baseband unit 113 exchanges the data with other network elements (not shown) over network links 115. Wireless access node 110 and UEs 101-109 perform error correction on the data per an error correction target.

To perform uplink error correction, UEs 101-109 add information that characterizes the uplink data, like Cyclic Redundancy Check (CRC) bits and/or sequence numbers, before wireless transmission to radio 111. Baseband unit 112 checks the uplink data for consistency with its characterizing information. For example, baseband unit 112 may verify the accuracy of the received CRC against the corresponding received data. Baseband unit 112 transfers acknowledgements (ACKs) back to UEs 101-109 when the uplink data is consistent with the characterizing information. Baseband unit 112 transfers Negative ACKs (NACKs) back to UEs 101-109 when the uplink data is inconsistent with the characterizing information. This inconsistent data is corrupt. Baseband unit 112 transfers NACKs back to UEs 101-109 when the uplink data is missing from a sequence. UEs 101-109 retransmit redundant data in response to the NACKs if required to achieve the error correction target. UEs 101-109 do not retransmit redundant data if the error correction target will still be achieved without retransmission. The corrupt or missing data that is not retransmitted is lost. The lost data is typically retransmitted by higher error correction layers.

To perform downlink error correction, baseband unit 112 adds information that characterizes the downlink data before wireless transmission to UEs 101-109 like CRC bits and/or sequence numbers. UEs 101-109 check the downlink data for consistency with its characterizing information. UEs 101-109 transfer ACKs back to baseband unit 112 when the downlink data is consistent with the characterizing information. UEs 101-109 transfer NACKs back to baseband unit 112 when the downlink data is inconsistent with the characterizing information. UEs 101-109 transfer NACKs back to baseband unit 112 when the downlink data is missing from a numbered sequence. Baseband unit 112 retransmits redundant data in response to the NACKs if necessary to achieve the error correction target. Baseband unit 112 does not retransmit the redundant data if the error correction target will still be achieved without the retransmission. The corrupt or missing data is lost but is usually retransmitted by higher data processing layers.

In some examples, the error correction target comprises a ratio of the amount of lost data to the amount of transmitted data. In other examples, the error correction target comprises a ratio of the amount of retransmitted and lost data to the total amount of transmitted data. Other error correction targets could be used that indicate the ratio of the wireless communication errors to the accurate wireless communications. The error correction technology may comprise Hybrid Automatic Repeat Request (HARQ). The error correction target may comprise HARQ Block Error Rate (BLER).

Wireless access node 110 dynamically controls the error correction target as follows. Baseband unit 112 locates UEs 101-109 through UE reports, UE signal-strength, direction-of-arrival, and/or the like. Baseband unit 112 identifies concentrations of UEs 101-109 at a location. The location could be a common distance or distance range from radio 111. In this example, geographic area 115 is separated into three locations based on distance ranges from radio 111: adjacent, middle, and edge. In examples where geographic area 116 is a network sector, these locations comprise an adjacent subsector, middle subsector, and edge subsector. Baseband unit 112 identifies any concentration of UEs 101-109 in the adjacent, middle, and edge locations. On FIG. 1, a concentration of six UEs 104-109 is in the edge location of geographic area 116.

Baseband unit 112 detects the location and size of the UE concentration. Baseband unit 112 modifies the error correction target and based on the location and size of the concentration. For example, baseband unit 112 may host a data structure or algorithm that translates the number of UEs 101-109 in each of the three locations into a concentration location and a concentration intensity. Baseband unit 112 may also host another data structure or algorithm that translates the concentration location and intensity into the error correction target. When the same number of UEs are in all three locations (adjacent, middle, edge), there are no concentrations. When one of the locations has significantly more UEs than the other locations, then the location with more UEs has a concentration. A concentration has a minimum number of UEs at the location and also has a minimum percentage of all of the UEs in geographic area 116. For example, an edge concentration may require at least 20 UEs in the edge location and at least 50% of all of the UEs in geographic area 116. In this simplified example, a concentration of six UEs 104-109 is depicted at the edge location.

Without any concentrations, the target error rate may be set at a default value for a random or even distribution of UEs. Baseband unit 112 may vary the default value based on UE load and possibly other metrics when no UE concentrations are present. A higher UE load would cause a higher error correction target. When a UE concentration appears, this default value is modified based on the size and location of the UE concentration. For example, a UE concentration in the edge location increases the error correction target as the edge concentration increases. A UE concentration in the adjacent location decreases the error correction target as the adjacent concentration increases. A UE concentration in the middle location, slightly increases the error correction target as the middle concentration increases. Baseband unit 112 also takes reciprocal action to reverse the error correction target as the UE concentrations decrease and then disappear.

After modifying the error correction target, radio 111 wirelessly exchanges data with wireless UEs 101-109 and exchanges the data with baseband unit 112. Baseband unit 112 exchanges the data with radio 111. Some of this data is corrupt or missing after the exchange. Baseband unit 112 exchanges redundant data with radio 111 to replace the corrupt and missing data when required to achieve the modified error correction target. Baseband unit 112 does not exchange the redundant data with radio 111 when the modified error correction target will be achieved without retransmission. Baseband unit 112 generally tolerates more errors when high edge concentrations occur and tolerates fewer errors when high adjacent concentrations occur.

Figure 2:
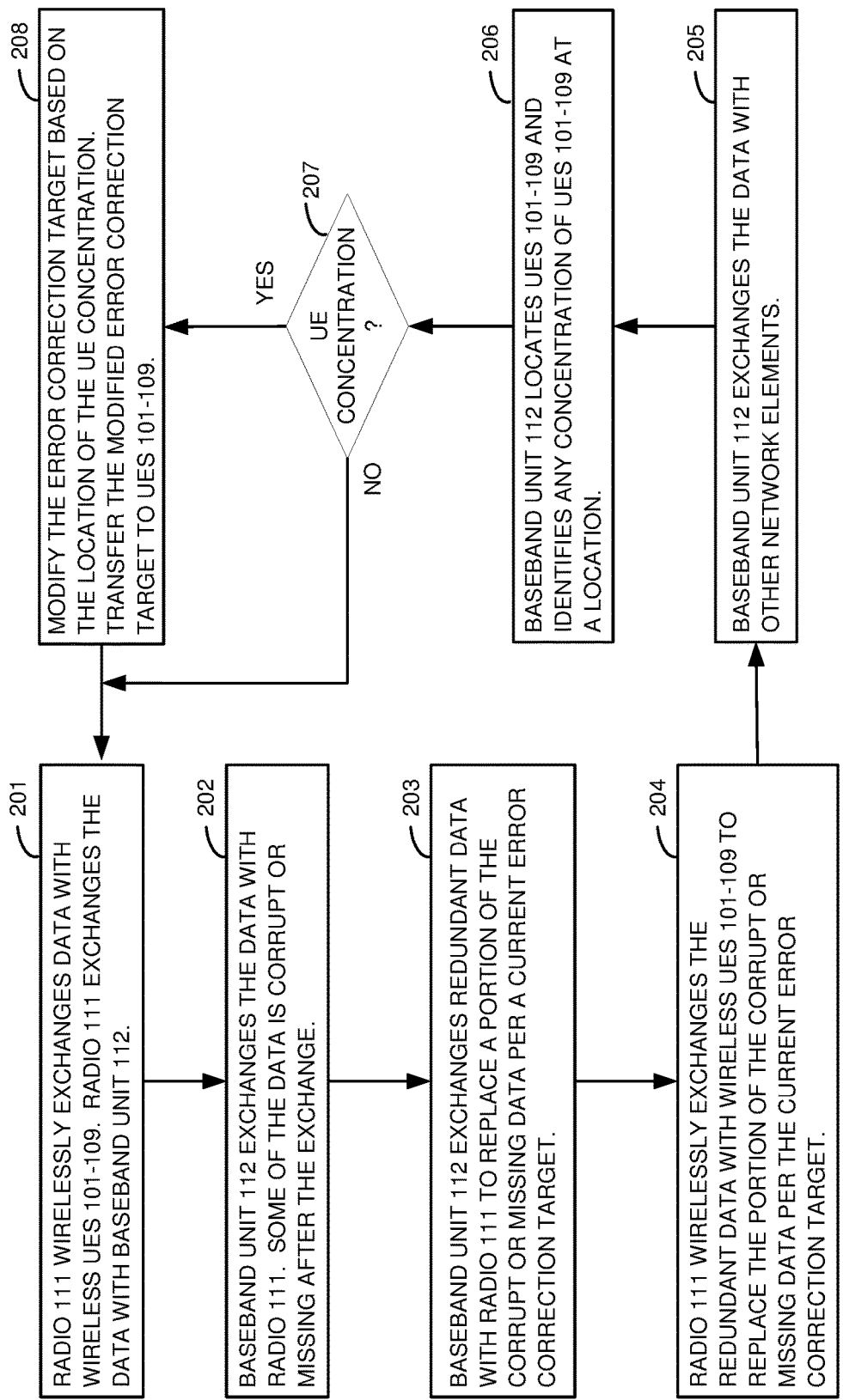
FIG. 2 illustrates the operation of the wireless communication network to control error correction for the wireless data communications with the wireless UEs based on UE location.

FIG. 2 illustrates the operation of wireless communication network 100 to control error correction for wireless data communications with wireless UEs 101-109 based on UE location. Radio 111 wirelessly exchanges data with wireless UEs 101-109 (201). Radio 111 exchanges the data with baseband unit 112. Baseband unit 112 exchanges the data with radio 111 (202). Some of the data is corrupt or missing after the exchange. Baseband unit 112 exchanges redundant data with radio 111 to replace a portion of the corrupt or missing data per the current error correction target (203). The redundant data is exchanged as required to achieve the error correction target, and the some corrupt or missing data is lost when the error correction target will still be met. Radio 111 wirelessly exchanges the redundant data with UE 101-109 to replace the portion of the corrupt and missing data (204). Baseband unit 112 exchanges the error-corrected data with other network elements (205). The error correction target comprises a ratio of lost data to accurately transmitted data. Baseband unit 112 locates UEs 101-109 and identifies any UE concentrations at a location (206). When a concentration is identified (207), baseband unit 112 modifies the error correction target based on the location and intensity of the concentration (208) and the operation repeats (201). The error correction target is increased as UEs concentrate near the edge, and the error correction target is decreased as UEs concentrate near radio 111. When no concentrations are identified (207), the operation repeats without modifying the error correction target (201).

Figure 3:
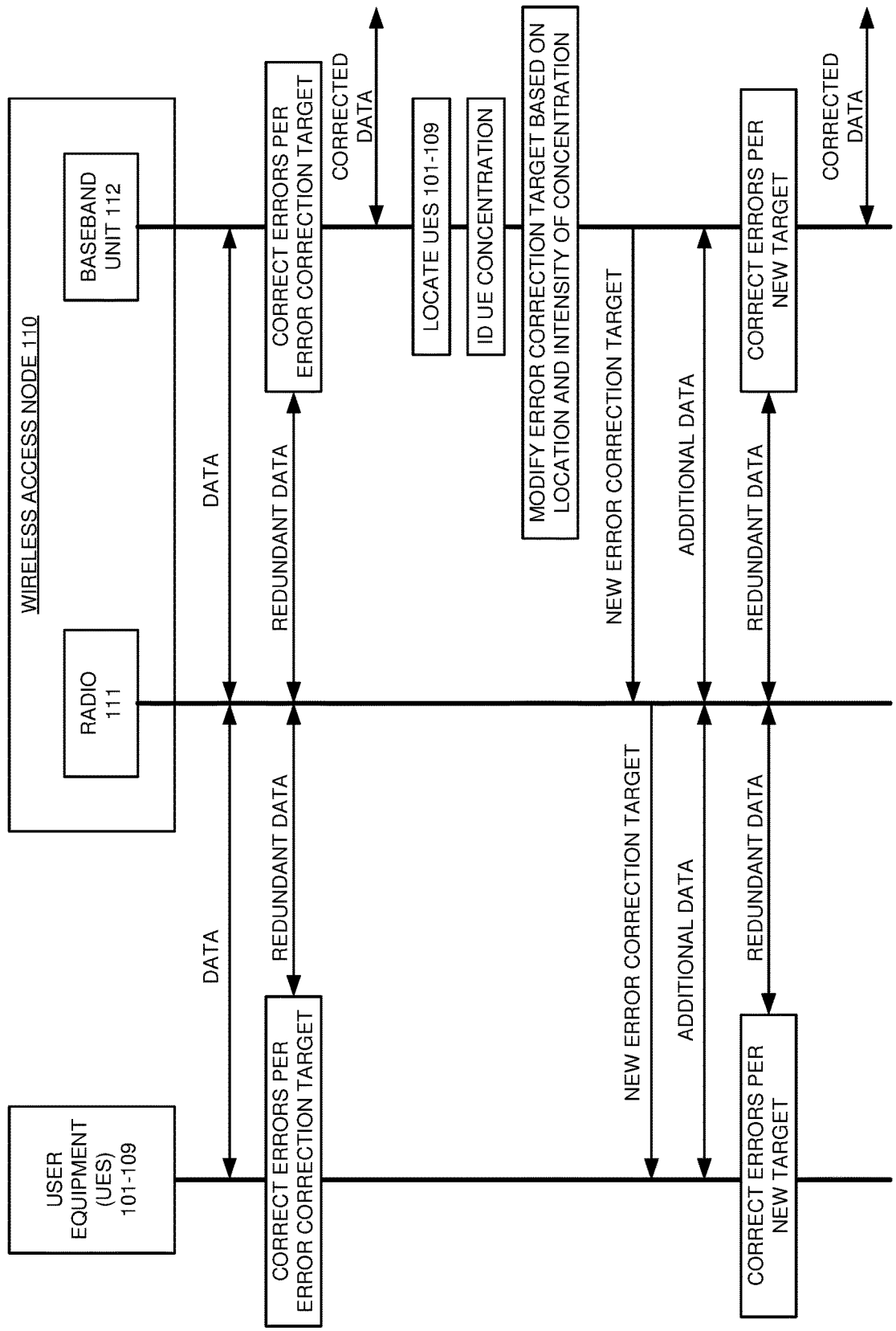
FIG. 3 illustrates the operation of the wireless communication network to control error correction for the wireless data communications with the wireless UEs based on UE location.

FIG. 3 illustrates the operation of wireless communication network 100 to control error correction for the wireless data communications with wireless UEs 101-109 based on UE location. Wireless UEs 101-109 and radio 111 wirelessly exchange data. Radio 111 and baseband unit 112 exchange the data. Some of the data is corrupt or missing after the exchange. Baseband unit 112 and UEs 101-109 perform error correction by exchanging redundant data over radio 111 to replace a portion of the corrupt or missing data per the error correction target. Some of the corrupt or missing data is not replaced per the error correction target. Baseband unit 112 exchanges the error-corrected data with other network elements (not shown). In some examples, the error correction target comprises a ratio of the amount of lost data to the amount of transmitted and retransmitted data. In other examples, the error correction target comprises a ratio of the amount of lost data to the amount of initially transmitted data.

Baseband unit 112 locates UEs 101-109 and identifies any UE concentration at a location. When a concentration is identified, baseband unit 112 modifies the error correction target based on the location and intensity of the concentration. Baseband unit 112 transfers the new error correction target to radio 111 for wireless delivery to UEs 101-109. Baseband unit 112 increases the error correction target when UEs concentrate near the edge. Baseband unit 112 decreases the error correction target when UEs concentrate near radio 111.

Wireless UEs 101-109 and radio 111 wirelessly exchange additional data. Radio 111 and baseband unit 112 exchange the additional data. Some of the additional data is corrupt or missing after the exchange. Baseband unit 112 and UEs 101-109 perform error correction by exchanging redundant data over radio 111 to replace a portion of the corrupt or missing data per the new error correction target. Some of the corrupt or missing data is not replaced per the new error correction target. Baseband unit 112 exchanges the error-corrected data with other network elements (not shown).

Advantageously, wireless access node 110 effectively and efficiently optimizes the error correction target based on the locations and intensities of the UE concentrations. When UEs concentrate at the edge, the error correction target is increased to allow more errors and mitigate excessive high-power retransmissions to and from the edge. When UEs concentrate at near radio 111, the error correction target is decreased to permit fewer errors given the low-power retransmissions that are required to correct the data and enhance UE Quality-of-Service (QoS). When UEs concentrate in the middle, the error correction target is slightly increased to prepare for an edge concentration and start some mitigation on retransmissions to and from the middle.

Figure 4:
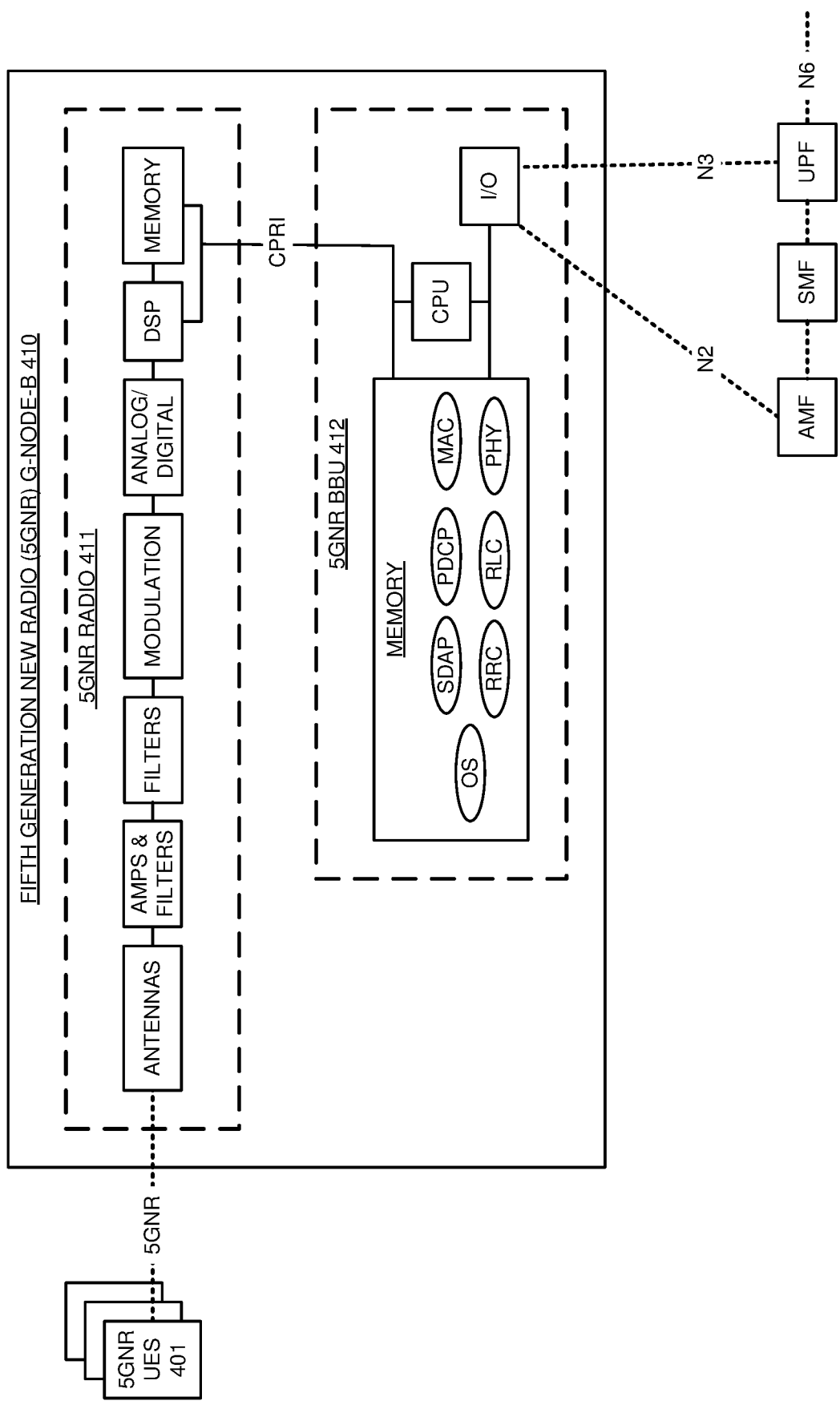
FIG. 4 illustrates a Fifth Generation New Radio (5GNR) gNodeB that controls Hybrid Automatic Repeat Request (HARQ) Block Error Rate (BLER) for 5GNR UEs based on UE location.

FIG. 4 illustrates Fifth Generation New Radio (5GNR) gNodeB 410 that controls Hybrid Automatic Repeat Request (HARQ) Block Error Rate (BLER) for 5GNR UEs 401 based on UE location. 5GNR gNodeB 410 is an example of wireless access node 110, although access node 110 may differ. 5GNR gNodeB 410 comprises 5GNR radio 411 and 5GNR Baseband Unit (BBU) 412 that are coupled over one or more Common Public Radio Interface (CPRI) links. 5GNR radio 411 comprises antennas, amps, filters, modulation, analog-to-digital interfaces, DSP, and memory that are coupled over bus circuitry. 5GNR BBU 412 comprises memory, CPU, and data Input/Output (I/O) that are coupled over bus circuitry.

In 5GNR BBU 412, the memory stores operating systems (OS), Physical Layer (PHY), Media Access Control (MAC), Radio Link Control (RLC), Packet Data Convergence Protocol (PDCP), Service Data Adaptation Protocol (SDAP), and Radio Resource Control (RRC). The CPU in 5GNR BBU 412 executes the operating systems, PHY, MAC, RLC, PDCP, SDAP, and RRC to drive the exchange of data between UEs 401 and the UPF. The CPU in 5GNR BBU 412 executes the operating systems, PHY, MAC, RLC, PDCP, and RRC to drive the exchange of signaling between 5GNR UEs 401 and the AMFs.

In 5GNR radio 411, the antennas receive wireless signals from 5GNR UEs 401 that transport uplink 5GNR signaling and uplink 5GNR data. The antennas transfer corresponding electrical uplink signals through duplexers and amps that boost the received uplink signals. The filters attenuate unwanted energy. Demodulators down-convert the uplink signals from their carrier frequencies. The analog/digital interfaces convert the analog uplink signals into digital uplink signals for the DSP. The DSP recovers uplink 5GNR symbols from the uplink digital signals. The DSPs transfer the uplink 5GNR symbols to 5GNR BBU 412 over the CPRI links. In 5GNR BBU 412, the CPU executes the network applications to process the uplink 5GNR symbols and recover the uplink 5GNR data and uplink 5GNR signaling.

The network applications in 5GNR BBU 412 receive downlink N2 signaling from the AMFs. The network applications process the uplink 5GNR signaling and downlink N2 signaling to generate new uplink N2 signaling and new downlink 5GNR signaling. The network applications transfer the new uplink N2 signaling to the AMFs over the data I/O and backhaul links. The network applications transfer uplink N3 data that corresponds to the uplink 5GNR data to the UPFs over the data I/O and N3 links. The network applications receive new downlink N3 data from the UPFs over the data I/O and N3 links.

The network applications process the new downlink 5GNR signaling and the new downlink N3 data to generate corresponding downlink 5GNR symbols in the frequency domain. The network applications transfer the downlink 5GNR symbols to 5GNR radio 411 over the CPRI links. In 5GNR radio 411, the DSP processes the downlink 5GNR symbols to generate corresponding digital signals for the analog-to-digital interfaces. The analog-to-digital interfaces convert the digital downlink signals into analog downlink signals for modulation. Modulation up-converts the downlink signals to their carrier frequencies. The filters attenuate unwanted out-of-band energy and transfer the filtered downlink signals through duplexers to amps which boost the filtered downlink signals. The electrical downlink signals drive the antenna to emit corresponding wireless signals that transport the downlink 5GNR signaling and downlink 5GNR data to 5GNR UEs 401.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Wireless UEs 401 and the network applications in 5GNR BBU 412 exchange 5GNR data over 5GNR radio 411 and the 5GNR links. The network applications exchange the data with the UPFs. The network applications in 5GNR BBU 412 and 5GNR UEs 401 perform HARQ error correction on the 5GNR data per a HARQ Block Error Rate (BLER). In this example, the HARQ BLER comprises a ratio of the amount of lost data to the total amount of transmitted and retransmitted data. In other examples, the HARQ BLER comprises different ratios that indicate data errors relative to accurate data reception.

On the uplink, the network applications in 5GNR BBU 412 check the CRCs and possibly sequence numbers for the uplink data. The network applications transfer ACKs back to 5GNR UEs 401 when the uplink data is accurately received. The network applications transfer NACKs back to 5GNR UEs 401 when the uplink data is corrupt or missing. The network applications receive redundant data from 5GNR UEs 401 over 5GNR radio 411 and the 5GNR links to replace a portion of the corrupt or missing data. The size of this replaced data portion on the uplink is controlled by the uplink HARQ BLER. The network applications transfer the error-corrected uplink data to the UPFs over N3 data links.

On the downlink, the network applications in 5GNR BBU 412 add CRCs and possibly sequence numbers to the downlink data. The network applications receive ACKs and NACKs from 5GNR UEs 401. The network applications transfer redundant data to 5GNR UEs 401 over 5GNR radio 411 and the 5GNR links to replace a portion of this corrupt or missing data. The size of this replaced data portion on the downlink is controlled by the downlink HARQ BLER. The network applications transfer the error-corrected downlink data to 5GNR UEs 401 over 5GNR radio 411 and the 5GNR links.

The network applications in 5GNR BBU 412 dynamically control the uplink and downlink HARQ BLER as follows. The network applications locate 5GNR UEs 401 through UE location reports, received signal-strength, direction-of-arrival, or some other location technique. The network applications identify concentrations of UEs 401 at a location based on the individual UE locations. In this example, the concentration locations comprise an adjacent subsector near 5GNR radio 411, a middle subsector, and an edge subsector distant from radio 411. A concentration in a subsector will have a minimum number of 5GNR UEs 401 in the subsector and also have a minimum percentage of all 5GNR UEs 401 in the entire sector.

The network applications in 5GNR BBU 412 modify the target HARQ BLER based on the location and the size of the UE concentrations. The network applications host a data structure that translates the number of 5GNR UEs 401 in each of the subsectors into a UE concentration location and a UE concentration intensity. The data structure then translates the UE concentration location and intensity into the target uplink HARQ BLER and the target downlink HARQ BLER. The data structure may yield the same HARQ BLER for the uplink and downlink or yield different HARQ BLERs for the uplink and downlink. The network applications increase the target BLERs as an edge concentration appears and then increases. The network applications decrease the target BLERs as an adjacent concentration appears and then increases. The network applications take reciprocal action to reverse these target BLER modifications as the concentrations decrease and then disappear. After modifying the HARQ BLERs, the network applications notify 5GNR UEs 401 over 5GNR radio 511 and the 5GNR links. 5GNR UEs 401 and 5GNR BBU 412 then use the modified BLERs for HARQ error correction on the uplink and the downlink.

Figure 5:
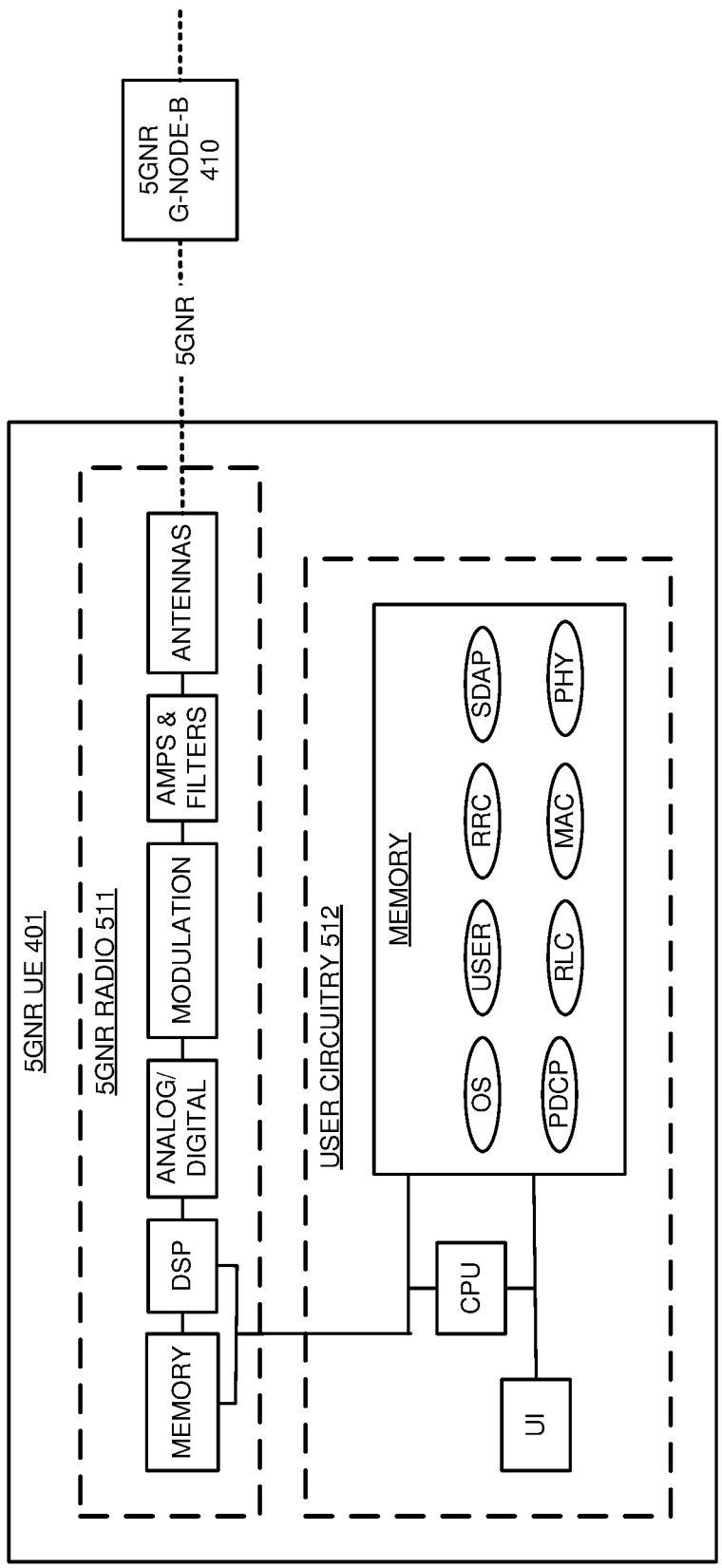
FIG. 5 illustrates one of the 5GNR UEs that receives HARQ BLER control from the 5GNR gNodeB based on UE location.

FIG. 5 illustrates one of 5GNR UEs 401 that receives HARQ BLER control from 5GNR gNodeB 410 based on UE location. 5GNR UE 401 is an example of UEs 101-109, although UEs 101-109 may differ. 5GNR UE 401 comprises 5GNR radio 511 and user circuitry 512 that are coupled over bus circuitry. 5GNR radio 511 comprises antennas, amps, filters, modulation, analog-to-digital interfaces, DSP, and memory that are coupled over bus circuitry. The antennas in 5GNR radio 511 are wirelessly coupled to the antennas in 5GNR gNodeB 410 over the 5GNR links.

User circuitry 512 comprises user interfaces (UI), CPU, and memory. The memory in user circuitry 512 stores operating systems, user applications (USER), and network applications for PHY, MAC, RLC, PDCP, SDAP, and RRC. The CPU executes the operating systems, user applications, and network applications to exchange signaling and data between the user applications and the network applications. The CPU executes the operating systems and network applications to wirelessly exchange corresponding 5GNR signaling and data with 5GNR gNodeB 410 over 5GNR radio 511 and the 5GNR links.

In 5GNR radio 511, the antennas receive wireless signals from 5GNR gNodeB 410 that transport downlink 5GNR signaling and downlink 5GNR data. The antennas transfer corresponding electrical downlink signals through duplexers to the amps. The amps boost the received downlink signals for filters which attenuate unwanted energy. In modulation, demodulators down-convert the downlink signals from their carrier frequencies. The analog/digital interfaces convert the analog downlink signals into digital downlink signals for the DSP. The DSP recovers downlink 5GNR symbols from the downlink digital signals. The CPU executes the network applications to process the downlink 5GNR symbols and recover the downlink 5GNR signaling and downlink 5GNR data. The network applications transfer the downlink data to the user applications over the operating system.

The network applications receive uplink user signaling and data from the user applications over the operating system. The network applications process the uplink user signaling and the downlink 5GNR signaling to generate new downlink user signaling and new uplink 5GNR signaling. The network applications transfer the new downlink user signaling to the operating system for delivery to the user applications. The network applications process the new uplink 5GNR signaling and the uplink user data to generate corresponding uplink 5GNR symbols. The DSP processes the uplink 5GNR symbols to generate corresponding digital signals for the analog-to-digital interfaces. The analog-to-digital interfaces convert the digital uplink signals into analog uplink signals for modulation. Modulation up-converts the uplink signals to their carrier frequencies. The filters attenuate unwanted out-of-band energy and transfer the filtered uplink signals through the amps to the antennas. The amps boost the modulated uplink signals. The electrical uplink signals drive the antennas to emit corresponding wireless signals that transport the uplink 5GNR data and the new uplink 5GNR signaling to 5GNR gNodeB 410.

RRC functions comprise authentication, security, handover control, status reporting, QoS, network broadcasts and pages, and network selection. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

5GNR gNodeB 410 and the network applications in user circuitry 512 exchange 5GNR data over 5GNR radio 511 and the 5GNR links. The network applications in user circuitry 512 and 5GNR gNodeB 410 perform HARQ error correction on the 5GNR data per a HARQ BLER. The network applications in user circuitry 512 use modified HARQ BLERs that are received from 5GNR gNodeB 410 to perform HARQ error correction. The network applications determine and report various metrics to 5GNR gNodeB 410 like received signal strength, interference, noise, location, and the like.

On the downlink, the network applications in user circuitry 512 check the CRCs and possibly sequence numbers for the downlink data. The network applications transfer ACKs back to 5GNR gNodeB 410 when the downlink data is accurately received. The network applications transfer NACKs back to 5GNR gNodeB 410 when the downlink data is corrupt or missing. The network applications receive redundant data from 5GNR gNodeB 410 over 5GNR radio 511 and the 5GNR links to replace a portion of the corrupt or missing data. The size of the replaced data portion on the downlink is controlled to achieve the downlink HARQ BLER. The network applications transfer the error-corrected downlink data to the user applications over the operating system.

On the uplink, the network applications add CRCs and possibly sequence numbers to the uplink data. The network applications receive ACKs and NACKs from 5GNR gNodeB 410. The network applications transfer redundant data to 5GNR gNodeB 410 over 5GNR radio 511 and the 5GNR links to replace a portion of this corrupt or missing data. The size of this replaced data portion on the uplink is controlled to achieve the uplink HARQ BLER.

Figure 6:
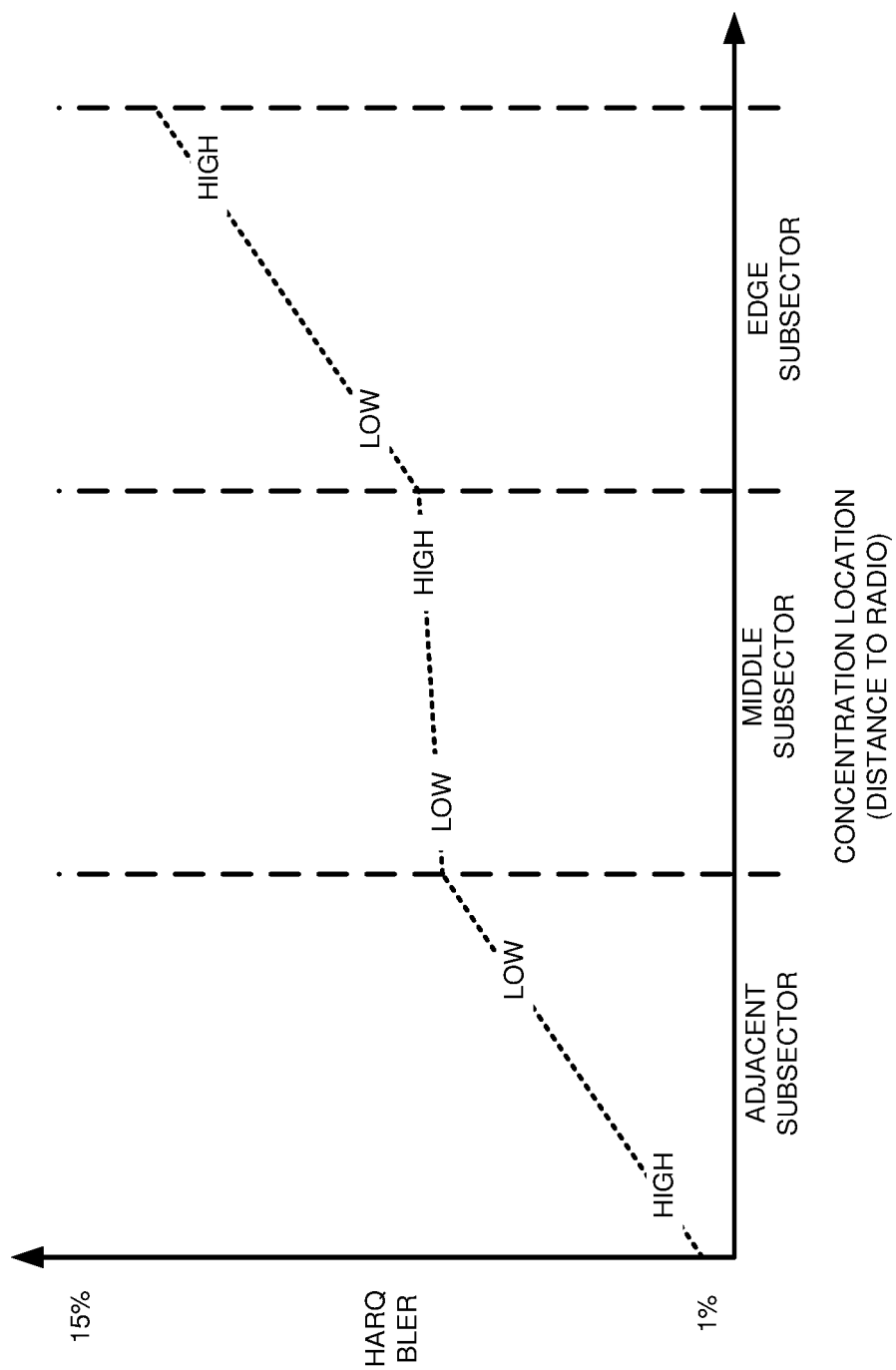
FIG. 6 illustrates the operation of the 5GNR gNodeB to control HARQ BLER for the 5GNR UEs based on UE location.

FIG. 6 illustrates the operation of 5GNR gNodeB 410 to control HARQ BLER for 5GNR UEs 401 based on UE location. On the graph, the vertical axis represents the target HARQ BLER for the uplink, downlink, or both. The horizontal axis represents UE concentration by subsector—adjacent, middle, and edge. Vertical dashed lines separate the subsectors. The dotted line indicates the intensity of a UE concentration in the subsector and yields the target BLER on the vertical axis. The graph is typically reduced to a data structure or algorithm for 5GNR gNodeB 410. The numbers on the graphs are illustrative and could be different in other examples.

When no UE concentrations are present, the graph is not used to control the HARQ BLER, although other metrics like sector load might be used. When a UE concentration appears in the adjacent sector, the intensity of the concentration controls the HARQ BLER by decreasing BLER as the adjacent concentration intensifies. When a UE concentration appears in the edge sector, the intensity of the concentration controls the HARQ BLER by increasing BLER as the edge concentration intensifies. When a UE concentration appears in the middle sector, the intensity of the concentration controls the HARQ BLER by slightly increasing BLER as the middle concentration intensifies.

Figure 7:
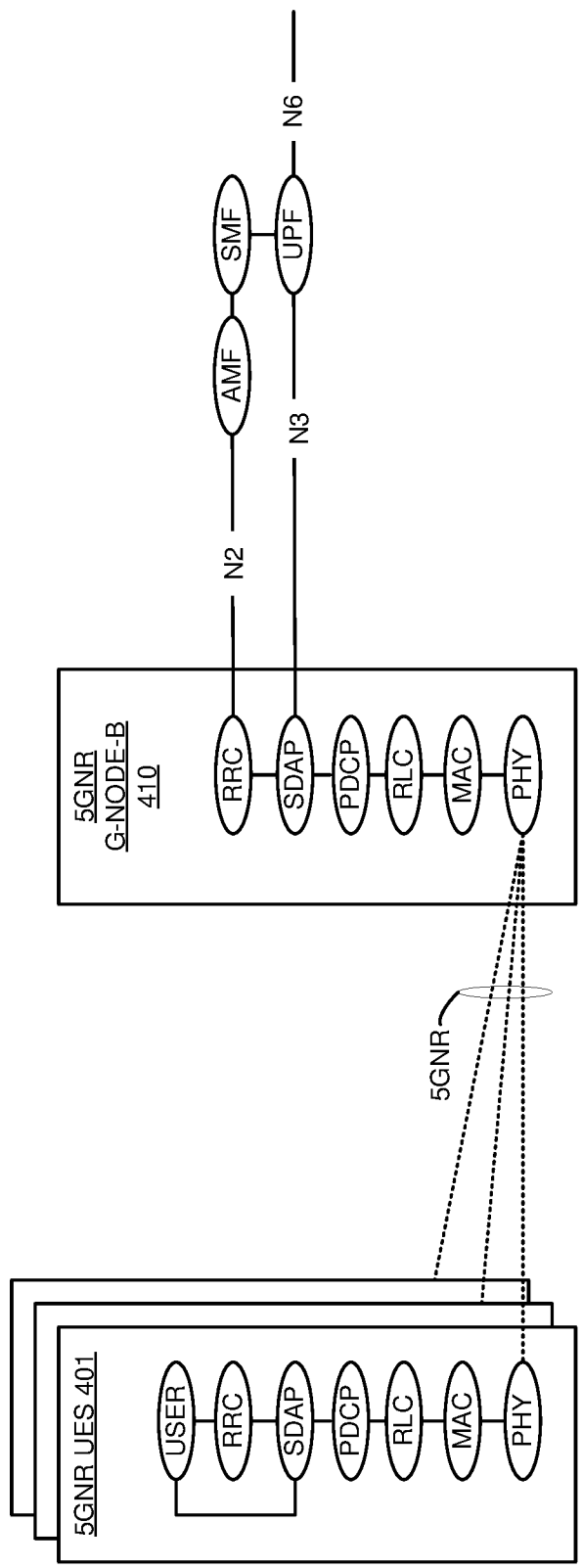
FIG. 7 illustrates the operation of the 5GNR gNodeB to control HARQ BLER for the 5GNR UEs based on UE location.

FIG. 7 illustrates the operation of 5GNR gNodeB 410 to control HARQ BLER for 5GNR UEs 401 based on UE location. In 5GNR UEs 401, the user applications exchange data with the SDAPs and exchange signaling with the RRCs through the operating systems. The RRCs in 5GNR UEs 401 exchange 5GNR signaling with the RRCs in 5GNR gNodeB 410 over the PDCPs, RLCs, MACs, and PHYs. The SDAPs in 5GNR UEs 401 exchange 5GNR data with the SDAPs in 5GNR gNodeB 410 over the PDCPs, RLCs, MACs, and PHYs. The RRCs in 5GNR gNodeB 410 exchange N2 signaling with the AMFs over backhaul links. The SDAPs in 5GNR gNodeB 410 exchange N3 data with the UPFs over the backhaul links. The AMFs signal the SMFs to direct the UPFs to serve 5GNR UEs 401. The UPFs exchanges the N3 data with the SDAPs in 5GNR gNodeB 410 and exchange corresponding data with external systems over the N6 links.

On the uplink, the MACs in 5GNR UEs 401 add CRCs and possibly sequence numbers to the uplink data. The MACs in 5GNR gNodeB 410 checks the CRCs and possibly the sequence numbers for the uplink data. The MACs in 5GNR gNodeB 410 transfer ACKs back to the MACs in 5GNR UEs 401 when the uplink data is accurately received. The MACs in 5GNR gNodeB 410 transfer NACKs back to the MACs in 5GNR UEs 401 when the uplink data is corrupt and possibly when the uplink data is missing. The MACs 5GNR gNodeB 410 receive redundant data from the MACs in 5GNR UEs 401 to replace a portion of the corrupt data—and possibly to replace a portion of the missing data as well. The size of the replaced uplink portion is controlled to achieve the uplink HARQ BLER. The MACs in 5GNR UEs 401 do not retransmit redundant data when the uplink HARQ BLER is met without retransmission. The MACs 5GNR gNodeB 410 transfer the error-corrected uplink data for delivery to the UPFs over the RLCs, PDCPs, SDAPs, and N3 data links.

On the downlink, the MACs in 5GNR gNodeB 410 add CRCs and possibly sequence numbers to the downlink data. The MACs in 5GNR UEs 401 check the CRCs and possibly the sequence numbers for the downlink data. The MACs in 5GNR UEs 401 transfer ACKs back to the MACs in 5GNR gNodeB 410 when the downlink data is accurately received. The MACs in 5GNR UEs 401 transfer NACKs back to the MACs in 5GNR gNodeB 410 when the downlink data is corrupt and possibly when the downlink data missing. The MACs 5GNR UEs 401 receive redundant data from the MACs in 5GNR gNodeB 410 to replace a portion of the corrupt data—and possibly to replace a portion of the missing data as well. The size of the replaced downlink portion is controlled to achieve the downlink HARQ BLER. The MACs in 5GNR gNodeB 410 do not retransmit redundant data when the HARQ BLER will be met without retransmission. The MACs 5GNR UEs 401 transfer the error-corrected downlink data for delivery to the user applications over the RLCs, PDCPs, SDAPs, and operating systems.

The MACs in 5GNR gNodeB 410 dynamically control HARQ BLER as follows. The MACs locate 5GNR UEs 401 through UE location reports, received signal-strength, direction-of-arrival, or some other location technique. The MACs identify concentrations of 5GNR UEs 401 in a subsector based on the individual UE locations. A UE concentration will have a minimum number of the 5GNR UEs 401 in the subsector and also have a minimum percentage of the 5GNR UEs 401 in the entire sector.

The MACs in 5GNR gNodeB 410 modify the target HARQ BLER based on the location and the size of the concentrations. The MACs host a data structure that translates the number of 5GNR UEs 401 in each subsector into the concentration location and intensity. The data structure then translates the concentration location and intensity into the target HARQ BLERs for the uplink and downlink. The data structure may yield the same HARQ BLER for the uplink and downlink or yield different HARQ BLERs for the uplink and downlink. The MACs increase the target BLERs when an edge concentration appears and then increases. The MACs decrease the target BLERs when an adjacent concentration appears and then increases. The MACs take reciprocal action to reverse the target BLERs as these concentrations decrease and then disappear. After modifying the HARQ BLERs, the MACs in 5GNR gNodeB 410 notify the MACs in 5GNR UEs 401 over their PHYs. The MACs in 5GNR UEs 401 and 5GNR gNodeB 410 then use the modified BLERs for HARQ error correction on the uplink and the downlink.

The wireless data network circuitry described above comprises computer hardware and software that form special-purpose access node circuitry to optimize the error correction target for wireless UEs based on UE location. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose access node circuitry to optimize the error correction target for wireless UEs based on UE location.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to control error correction for wireless User Equipment (UEs), the method comprising:

a radio wirelessly exchanging data with the wireless UEs and exchanging the data with a baseband unit;

the baseband unit exchanging the data with the radio wherein some of the data is corrupt or missing after the exchange between the radio and the wireless UE and the exchange between the radio and the baseband unit;

the baseband unit exchanging redundant data with the radio to replace a portion of the corrupt or missing data per an error correction target;

the radio wirelessly exchanging the redundant data with the wireless UEs to replace the portion of the corrupt or missing data per the error correction target;

the baseband unit determining an edge amount of the wireless UEs in an edge network subsector, determining a middle amount of the wireless UEs in a middle network subsector, and determining an adjacent amount of the wireless UEs in an adjacent network subsector wherein each of the network subsectors comprises a common distance range wherein the common distance range of each of the network subsectors is different from the common distance range of any other one of the network subsectors;
the baseband unit identifying a concentration of the wireless UEs in one of the network subsectors by determining an amount of the wireless UEs in the common distance range of the one of the network subsectors and responsively modifying the error correction target based on a location of the one of the network subsectors, a distance from the location to the radio, and an amount of the wireless UEs at the location;
the radio wirelessly exchanging additional data with the wireless UEs and exchanging the additional data with the baseband unit;
the baseband unit exchanging the additional data with the radio wherein some of the additional data is corrupt or missing after the additional exchange between the radio and the wireless UEs and the additional exchange between the radio and the baseband unit;
the baseband unit exchanging additional redundant data with the radio to replace a portion of the corrupt or missing additional data per the modified error correction target; and
the radio wirelessly exchanging the additional redundant data with the wireless UEs to replace the portion of the corrupt or missing additional data per the modified error correction target.

2. The method of claim 1 wherein the baseband unit exchanging the redundant data with the radio to replace the portion of the corrupt or missing data per the error correction target comprises performing Hybrid Automatic Repeat Request (HARQ).

3. The method of claim 2 wherein the error correction target comprises a HARQ Block Error Rate (BLER).

4. The method of claim 1 wherein the radio wirelessly exchanging the data and the redundant data with the wireless UEs comprises wirelessly exchanging Fifth Generation New Radio (5GNR) signals.

5. The method of claim 1 wherein:
the baseband unit identifying the concentration of the UEs comprises identifying an edge concentration of the UEs in the edge network subsector; and
the baseband unit modifying the error correction target comprises increasing the error correction target based on the edge concentration.

6. The method of claim 1 wherein:
the baseband unit identifying the concentration of the UEs comprises identifying a middle concentration of the UEs in the middle network subsector; and
the baseband unit modifying the error correction target comprises increasing the error correction target based on the middle concentration.

7. The method of claim 1 wherein:
the baseband unit identifying the concentration of the UEs comprises identifying an adjacent concentration of the UEs in the adjacent network subsector; and
the baseband unit modifying the error correction target comprises decreasing the error correction target based on the adjacent concentration.

8. The method of claim 1 wherein the baseband unit identifying the concentration of the UEs comprises determining the amount of the wireless UEs at the location exceeds a UE threshold.

9. The method of claim 1 wherein the baseband unit identifying the concentration of the UEs comprises determining the amount of the wireless UEs at the location exceeds a percentage of total wireless UEs.

10. The method of claim 1 further comprising the baseband unit determining the concentration of the UEs is no longer present and responsively resetting the modified error correction target to the error correction target.

11. A wireless access node to control error correction for wireless User Equipment (UEs), the wireless access node comprising:
a radio configured to wirelessly exchange data with the wireless UEs and exchange the data with a baseband unit;
the baseband unit configured to exchange the data with the radio wherein some of the data is corrupt or missing after the exchange between the radio and the wireless UE and the exchange between the radio and the baseband unit;
the baseband unit configured to exchange redundant data with the radio to replace a portion of the corrupt or missing data per an error correction target;
the radio configured to wirelessly exchange the redundant data with the wireless UEs to replace the portion of the corrupt or missing data per the error correction target;
the baseband unit is configured to determine an edge amount of the wireless UEs in an edge network subsector, determine a middle amount of the wireless UEs in a middle network subsector, and determine an adjacent amount of the wireless UEs in an adjacent network subsector wherein each of the network subsectors comprises a common distance range wherein the common distance range of each of the network subsectors is different from the common distance range of any other one of the network subsectors;
the baseband unit configured to identify a concentration of the wireless UEs in one of the network subsectors by determining an amount of the wireless UEs in the common distance range of the one of the network subsectors and responsively modify the error correction target based on a location of the one of the network subsectors, a distance from the location to the radio, and an amount of the wireless UEs at the location;
the radio configured to wirelessly exchange additional data with the wireless UEs and exchange the additional data with the baseband unit;
the baseband unit configured to exchange the additional data with the radio wherein some of the additional data is corrupt or missing after the additional exchange between the radio and the wireless UEs and the additional exchange between the radio and the baseband unit;
the baseband unit configured to exchange additional redundant data with the radio to replace a portion of the corrupt or missing additional data per the modified error correction target; and
the radio configured to wirelessly exchange the additional redundant data with the wireless UEs to replace the portion of the corrupt or missing additional data per the modified error correction target.

12. The wireless access node of claim 11 wherein the baseband unit is configured to perform Hybrid Automatic Repeat Request (HARQ).

13. The wireless access node of claim 12 wherein the error correction target comprises a HARQBlock Error Rate (BLER).

14. The wireless access node of claim 11 wherein the radio is configured to wirelessly exchange Fifth Generation New Radio (5GNR) signals.

15. The wireless access point of claim 11 wherein:
the baseband unit is configured to identify the concentration of the UEs comprises the baseband unit configured to identify an edge concentration of the UEs in the edge network subsector; and
the baseband unit is configured to modify the error correction target comprises the baseband unit configured to increase the error correction target based on the edge concentration.

16. The wireless access point of claim 11 wherein:
the baseband unit is configured to identify the concentration of the UEs comprises the baseband unit configured to identify a middle concentration of the UEs in the middle network subsector; and
the baseband unit is configured to modify the error correction target comprises the baseband unit configured to increase the error correction target based on the middle concentration.

17. The wireless access point of claim 11 wherein:
the baseband unit is configured to identify the concentration of the UEs comprises the baseband unit configured to identify an adjacent concentration of the UEs in the adjacent network subsector; and
the baseband unit is configured to modify the error correction target comprises the baseband unit configured to decrease the error correction target based on the adjacent concentration.

18. The wireless access point of claim 11 wherein the baseband unit is configured to identify the concentration of the UEs comprises the baseband unit configured to determine the amount of the wireless UEs at the location exceeds a UE threshold.

19. The wireless access point of claim 11 wherein the baseband unit is configured to identify the concentration of the UEs comprises the baseband unit configured to determine the amount of the wireless UEs at the location exceeds a percentage of total wireless UEs.

20. The wireless access point of claim 11 further comprising the baseband unit configured to determine the concentration of the UEs is no longer present and responsively reset the modified error correction target to the error correction target.

* * * * *